(12) United States Patent
Danneels et al.

(10) Patent No.: US 6,226,015 B1
(45) Date of Patent: May 1, 2001

(54) METHOD OF AUTOMATICALLY PRODUCING SKETCHES AND CARTOON IMAGES FROM MOVIES

(75) Inventors: Gunner D. Danneels, Beaverton, OR (US); Jason J. Howes, Somerville, MA (US); Peter A. Nee, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/030,648

(22) Filed: Feb. 25, 1998

(51) Int. Cl.[7] ................................................ G06T 13/00
(52) U.S. Cl. ......................... 345/473; 345/431; 345/432
(58) Field of Search ............................................. 345/473

(56) References Cited

U.S. PATENT DOCUMENTS

| 5,093,717 | * | 3/1992 | Sandrew | 358/81 |
| 5,621,868 | * | 4/1997 | Mizutani et al. | 345/431 |
| 5,696,892 | * | 12/1997 | Redmann et al. | 345/425 |
| 5,764,980 | * | 6/1998 | Davis et al. | 395/615 |
| 5,966,134 | * | 10/1999 | Arias | 345/431 |

OTHER PUBLICATIONS

Sukanya et al., "A new operator for image structure analysis", IEEE, pp. 615–618, 1996.*

* cited by examiner

*Primary Examiner*—Jeffery Brier
*Assistant Examiner*—Motilewa Good-Johnson
(74) *Attorney, Agent, or Firm*—Steven P. Skabrat (57) ABSTRACT

Sketch and cartoon images are automatically generated from video or still images captured in real-time from a digital camera or obtained from a stored file. Steps of the method include calculating luma values for each pixel in a captured or retrieved image, applying noise reduction techniques to the captured or retrieved image to improve its quality, performing an adaptive luma chroma difference computation to find and mark edges of objects in a captured or retrieved image as lines forming objects in a sketch image, and applying noise reduction to the sketch image. The process may be repeated for each frame in a video sequence. Temporal smoothing is applied to the video sequence of frames. Generated sketch images may be colored to produce cartoon images.

36 Claims, 10 Drawing Sheets

METHOD OF AUTOMATICALLY PRODUCING SKETCHES AND CARTOON IMAGES FROM MOVIES

BACKGROUND OF THE INVENTION

1. FIELD OF THE INVENTION

The present invention relates generally to computer graphics in computer systems and more specifically to generating sketches and cartoon images from digital video images.

2. DESCRIPTION OF RELATED ART

Digital special effects have been used in television and film productions to create images that cannot be created naturally by capturing a scene with a camera. Such special effects are typically generated through the use of expensive and specialized computer equipment by professional special effects personnel. However, with the increasing acceptance of powerful personal computers (PCs), there is a large and growing mass market for software capable of manipulating images for their entertainment effects. In addition, the introduction of inexpensive digital cameras which can be coupled to PCs creates new opportunities for the combined uses of PC and cameras. It is desirable for such systems to provide the capability for ordinary PC users to produce special effects related to images captured by digital cameras for entertainment purposes.

SUMMARY OF THE INVENTION

An embodiment of the present invention is a method of generating a sketch image by performing an adaptive luma chroma difference calculation to find and mark edges of objects in an input image as lines forming objects in the sketch image.

Another embodiment of the present invention is a system for generating a sketch image including an image capture device to obtain a first image, and a sketch generator coupled to the image capture device to produce a sketch image based on the first image by performing an adaptive luma chroma difference calculation to find and mark edges of objects in first input image as lines forming objects in the sketch image.

Another embodiment of the present invention is a method for automatically generating a sketch image including the steps of determining a luma value for each pixel in a first image, determining a luma change threshold for each pixel in the first image; marking edge pixels in the sketch image based on the luma values and luma change thresholds, and coloring the edge pixels a first color.

BRIEF DESCRIPTION OF THE DRAWINGS

The features and advantages of the present invention will become apparent from the following detailed description of the present invention in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, systems and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention is a method that automatically converts images captured by a camera-equipped PC into sketches and cartoons. The sketches and cartoons can be displayed in sequence as a movie on the PC's monitor or other display device for viewing by users or can be captured as individual images for storage, retrieval, manipulation, and printing. Sketches are images that have all color removed and consist of black (or other suitable color) lines defining the shape of the objects in the original image on a white (or other suitable light color) background. Cartoons are images which start as a sketch and are then either partially or fully colored. The coloring operation can return the colors of the original image (perhaps altered to provide a similar palette of colors), supply a "washed out" or pastel effect, or introduce a new coloring scheme not present in the original image. The sketch and cartoon images can be manipulated on screen with a drawing program or printed on a printer coupled to a PC. In the case of sketches, the printed images may then be colored with traditional art materials such as crayons, colored markers, paints, etc.

Embodiments of the present invention include methods for producing sketch and cartoon images and movies for entertainment purposes, for generating a sketch from luma changes, and for the use of adaptive thresholds to maintain a consistent level of detail (density of black pixels) across the entire sketch. In prior art edge finding systems, maps of edges are produced in order to fit other models to the edge data, such as in machine vision applications. However, these edge maps are not produced for end user consumption. Additionally, such edge finding algorithms are very complex, resulting in slow performance. In contrast, the present invention uses a simple luma differencing method for faster operating speed and better overall performance.

Generally, to produce a sketch from an original image, an embodiment of the present invention captures an image bitmap from a PC camera or retrieves a previously captured or rendered image from a file stored on a PC. Wherever there is a luma change in the image above a predetermined threshold, the corresponding pixel in a sketch image is colored black. The sketch image is then traversed to reduce noise pixels. Noise pixels are individually colored pixels that do not belong to a recognized line in the sketch image. Pixels within objects of the sketch images are set to color values to produce the cartoon image. Any pixel that is not part of a line in the sketch image is considered to be within an object for purposes of the cartoon image. The black pixels in the sketch image are the edges of objects in a scene. Any white pixel in the sketch image is considered to be within an object. The sketch and cartoon generation process is repeated for each image or frame of a video sequence to produce a sketch or cartoon movie.

Figure 1:
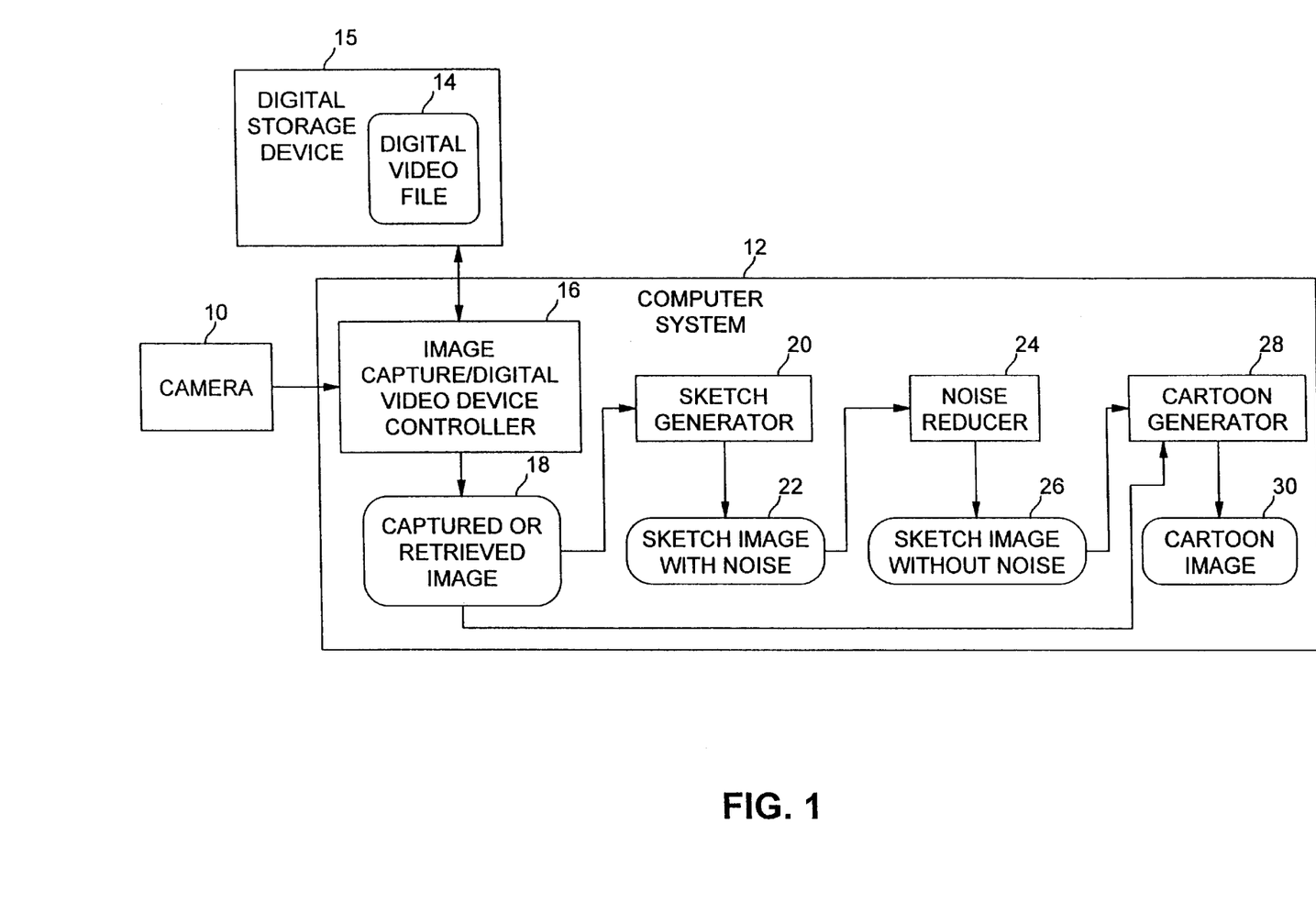
FIG. 1 is a high level block diagram of an embodiment of the present invention.

FIG. 1 is a high level block diagram of an embodiment of the present invention. A camera 10 is tethered to a computer system 12. The camera 10 captures an image and sends an image bitmap to the computer system. In one embodiment, the camera is an analog camera outputting image data in the National Television Standards Committee (NTSC) analog format. The image data is captured by image capture/digital video device controller function 16 and converted to a digital format for further processing. In another embodiment, the camera is a digital camera capable of capturing still images as well as streaming video and the computer system is a PC, although other cameras and computer systems (such as general purpose engineering workstations, minicomputers, and the like, and special purpose digital systems) may also be used. Example embodiments of the camera 10 are the digital camera based on the 971 camera kit commercially available from Intel Corporation, and the digital camera included in the Create & Share camera pack, also commercially available from Intel Corporation, although other digital cameras are also suitable for use in the present invention.

The digital camera is coupled to the computer system by a bus (not shown). In various embodiments, the bus is an Universal Serial Bus (USB), parallel port, or 1394 bus, although other buses and interface standards may also be used for coupling the camera to a digital I/O port of the computer system. When a digital camera is used, image capture/digital video device controller function 16 represents driver software that receives the digital frames from the camera and stores the frames into memory or other storage devices.

In an alternate embodiment, the image bitmap is captured or otherwise generated and stored in digital form in digital video file 14 within a digital storage device 15. The image bitmap is subsequently retrieved from the digital video file as needed. The digital video file 14 is stored on a digital storage device 15 readable by the computer system such as a hard disk drive, a floppy drive, a compact disc read only memory (CDROM), a digital versatile disk (DVD), or other suitable storage device. In one embodiment, the image bitmaps comprising the video sequence are stored in the well known Audio Video Interleaved (AVI) format, although other video and still image formats may also be used.

Computer system 12 includes an image capture/digital video device controller function 16. In one embodiment, this function, as well as other functions disclosed herein, are implemented in software. In other embodiments, this function is implemented in special-purpose hardware. The image capture/digital video device controller function receives an image bitmap from either the camera 10 or a digital video file 14 and outputs the image bitmap as captured or retrieved image 18. The captured or retrieved image is input to a sketch generator 20 function. The sketch generator processes the captured or retrieved image according to steps further detailed below to produce a sketch image with noise 22. The generated sketch image typically contains various undesirable artifacts which are called noise. These artifacts are eliminated by noise reducer 24 to produce a sketch image without noise 26. The sketch image without noise may be saved, displayed, printed, or combined with other sketch images in sequence to generate a sketch movie based on the original images captured by the camera. Optionally, the sketch image without noise is input to cartoon generator function 28. Cartoon generator 28 colors portions or all of the objects and backgrounds of the sketch image without noise 26 to produce cartoon image 30. The captured or retrieved image 18 is also used as a reference image by the cartoon generator 28 during generation of the cartoon image. The cartoon image may be saved, displayed, printed, or combined with other cartoon images in sequence to generate a cartoon movie based on the original images captured by the camera. All of the above operations may be performed in real-time, thereby displaying to the user a sketch or cartoon movie based on the scenes currently being captured by the tethered digital camera or fetched from the digital video file.

Figure 2:
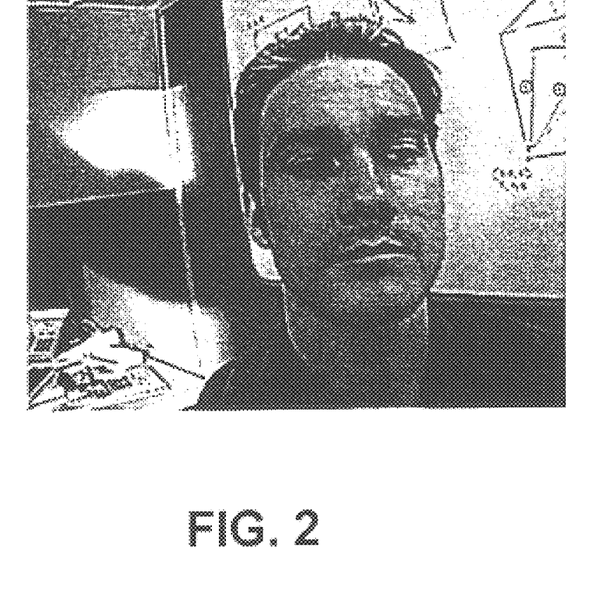
FIG. 2 is an example of a captured image.
Figure 3:
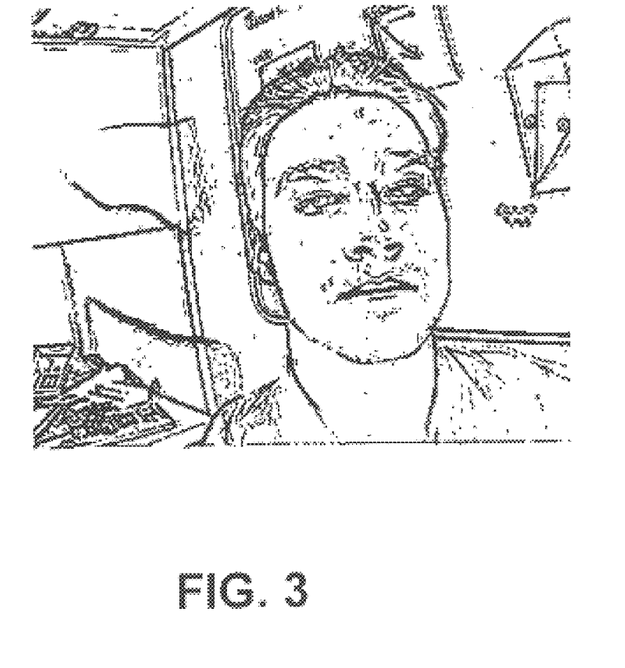
FIG. 3 is an example of the captured image of FIG. 2 transformed into a sketch image.
Figure 4:
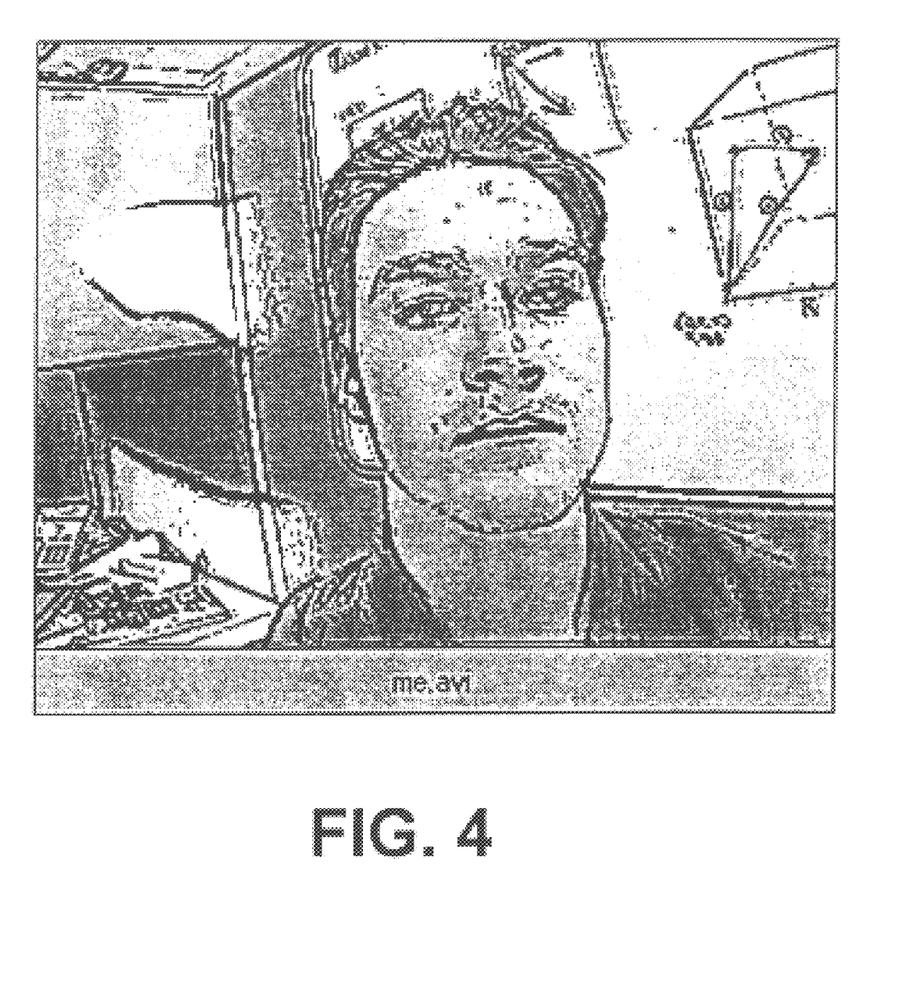
FIG. 4 is an example of the sketch image of FIG. 3 transformed into a cartoon image.

Illustrative examples of images manipulated by an embodiment of the present invention are shown in FIGS. 2 through 4. FIG. 2 is an example of a captured image. In this example, the image has been captured by a digital camera mounted on top of a PC's monitor and coupled to the PC by an USB. FIG. 3 is an example of the captured image of FIG. 2 transformed into a sketch image. This sketch image has noise in it, as can be seen from the artifacts present. FIG. 4 is an example of the sketch image of FIG. 3 transformed into a cartoon image. In this example, the cartoon image is a frame from a movie in the AVI format. The image of FIG. 4 shows many gray scale colors because it was printed on a monochrome computer printer. However, it should be understood by those skilled in the art that the image can contain many colors when printed on a color printer or when displayed on a color monitor.

Figure 5:
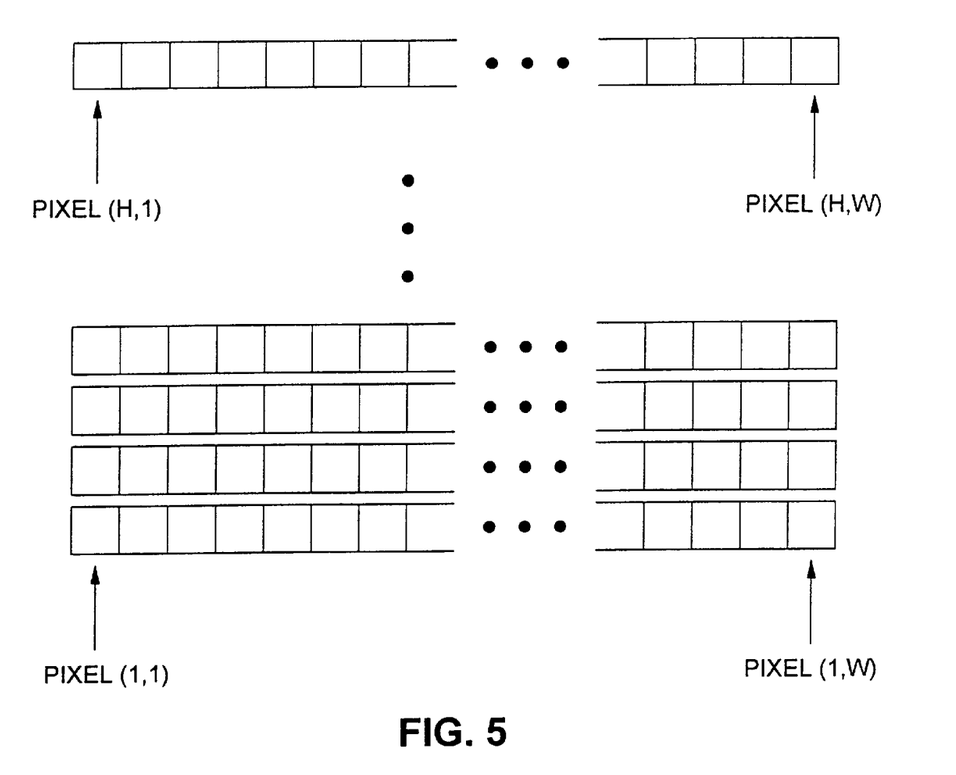
FIG. 5 is a diagram of an image bitmap.

FIG. 5 is a diagram of an image bitmap. The image bitmap is the data representation of an image within the camera and the computer system. The image bitmap consists of individual pixels arranged as a two dimensional array of individual pixel values. Each pixel value contains either red, green, and blue (RGB) components or luma and chroma (YUV) components. The array can be viewed as a number of lines of pixels. FIG. 5 shows an image bitmap that is W pixels wide by H lines high. Each pixel is referenced by its location in the image bitmap, e.g., pixel (R,C) corresponding to the pixel at row R and column C.

An interior pixel is defined as a pixel with (1<R<H) and (1<C<W). An interior pixel always has exactly eight neighboring pixels in the image bitmap. A border pixel is one that does not have eight neighboring pixels because it is in the first or last row or column of the image bitmap. An edge or edge pixel corresponds to the boundary of an object in a real life scene that was captured by an image. A video stream is a series of image bitmaps (also known as frames).

Figure 6:
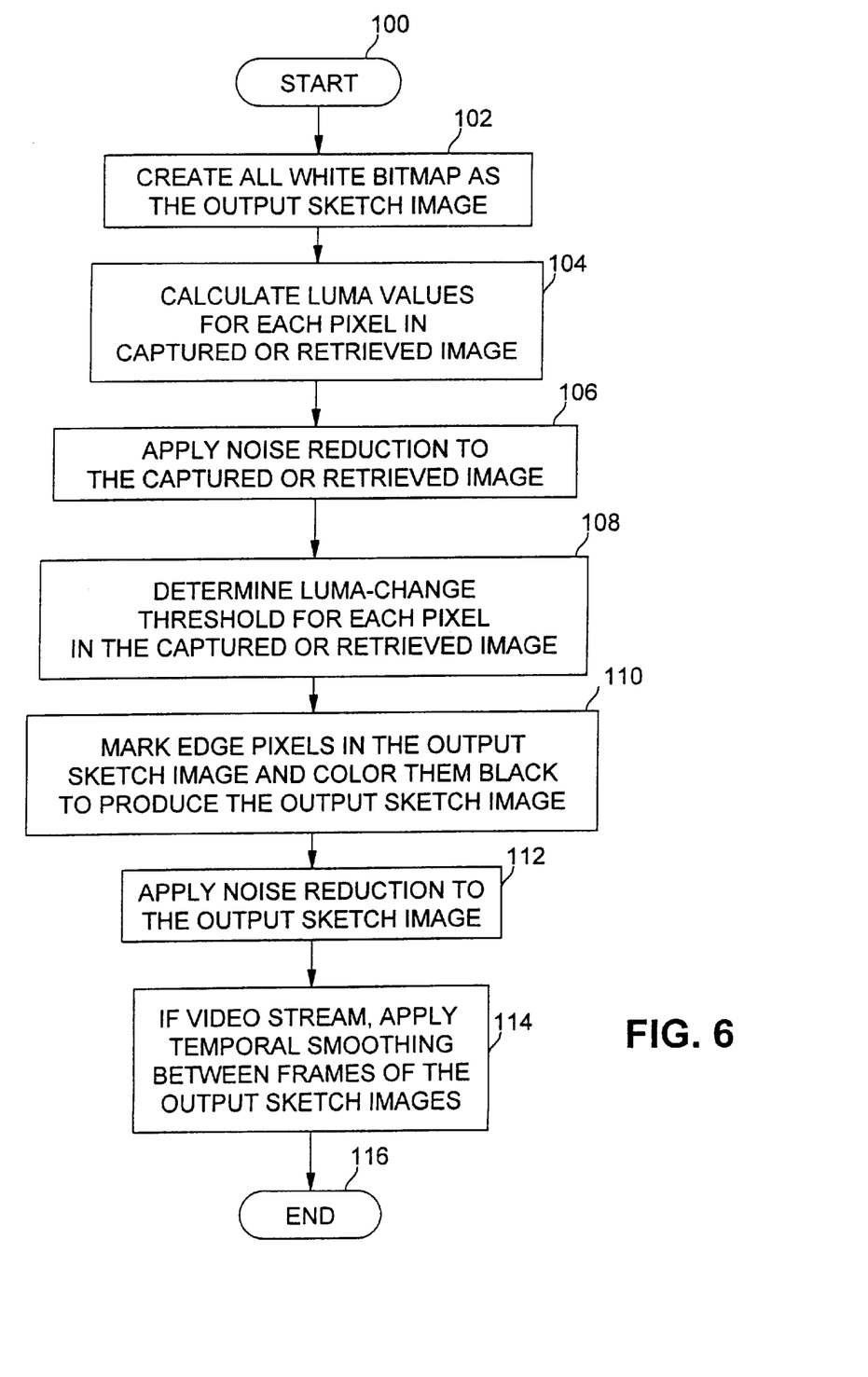
FIG. 6 is a flow diagram of an embodiment of the present invention.

FIG. 6 is a flow diagram of an embodiment of the present invention. The method performs an adaptive luma chroma difference computation to find and mark the edges of objects in the original captured or retrieved image as lines of corresponding objects in the sketch image. The method assumes that luma values ranging from 0 to 255 are part of each pixel's representation. If the color data provided by the input source (i.e., either the camera or digital video file) is not in a format that includes luma values (e.g., RGB format), then luma values are obtained by translating the input image bitmap to a format (e.g., YUV9) that does contain luma values according to methods well known in the art. After start step 100, at step 102 an all white colored image bitmap is created for use as the output sketch image. At step 104, luma values for each pixel in the captured or retrieved image are calculated, if the image was in a format that had to be translated. Next, noise reduction is applied to the captured or retrieved image at step 106. In one embodiment, an in-place weighted average with neighboring pixels is used. However, one skilled in the art will appreciate that other noise reduction algorithms may also be used.

At step 108, the luma-change thresholds T(R,C) for each pixel in the captured or retrieved image are determined. The threshold values are stored in an internal table. In one embodiment, the storage requirements for the threshold values are minimized by grouping the pixels, so that instead of calculating and storing thresholds for every pixel, the image is divided into 32 blocks and a threshold is computed for each block. Accordingly, the block that a given pixel resides in is used to determine the applicable luma threshold. Generally, pixels and blocks have a 1:1 correspondence. Step 108 is further detailed below with reference to FIG. 7. At step 110, the edge pixels in the output sketch image corresponding to the edges of objects in the captured image are marked and colored black to create the sketch lines, thereby producing the output sketch image. This step is further detailed below with reference to FIG. 8. Once the output sketch image is complete, noise reduction is applied to the output sketch image at step 112. This step is further detailed below with reference to FIG. 9. Finally, if the current processing is for a video stream, temporal smoothing between successive frames of the output sketch images is applied to the sketch images at step 114 before processing ends at end step 116. The temporal smoothing step is further discussed with reference to FIG. 10. Temporal smoothing is applied to avoid jittery edges and other artifacts in the sequence of output sketch images.

Figure 7:
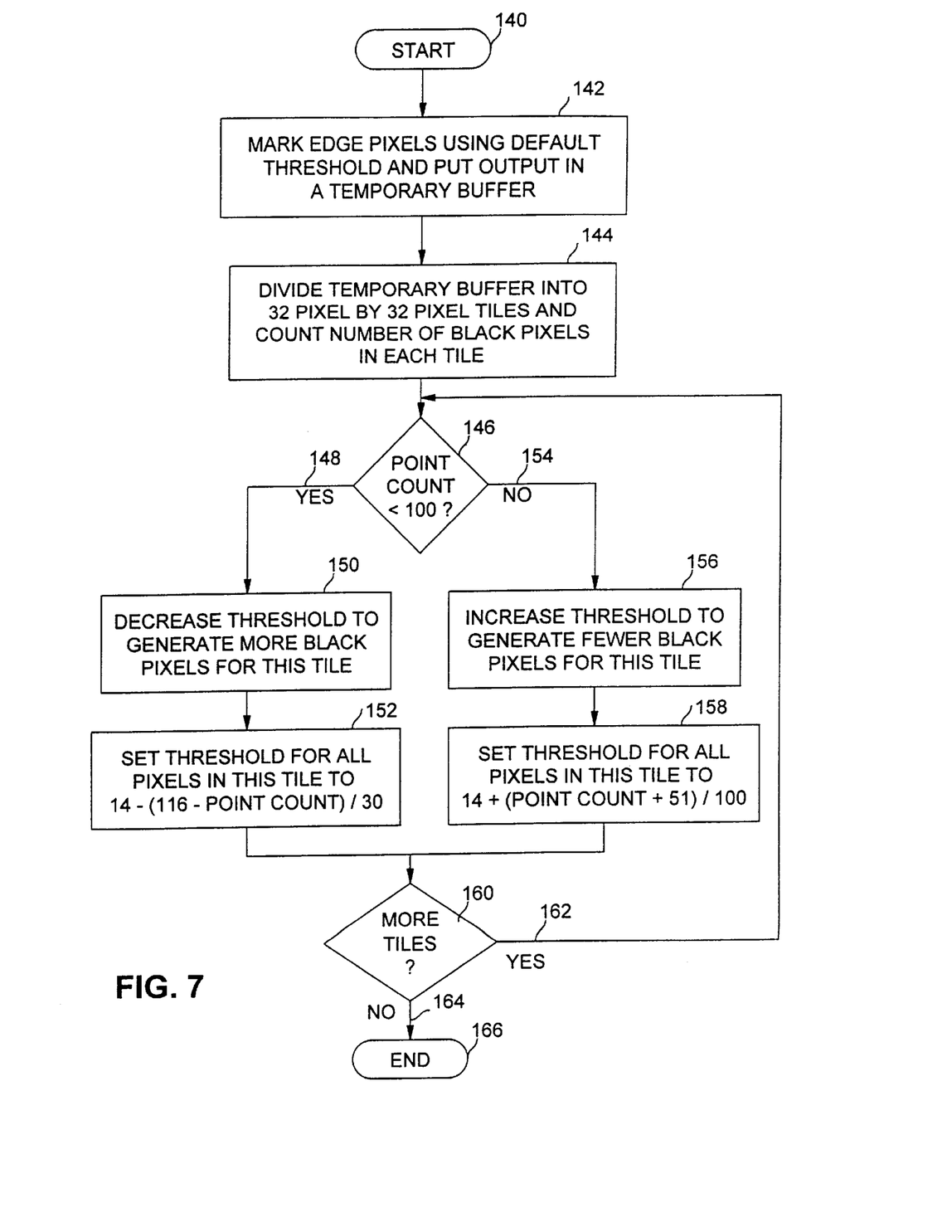
FIG. 7 is a flow diagram of the steps for adaptive threshold calculation.

FIG. 7 is a flow diagram of the steps for the adaptive threshold calculations of step 108 of FIG. 6. After start step 140, the edge pixels of the captured image are marked using a default threshold of T(R, C)=14 for all row (R) and column (C) indices and this output is stored in a temporary buffer at step 142. For each pixel in the image, there is a threshold T(R, C) used to determine the level of change in the luma that constitutes an edge of an object in the image. This threshold is initialized to the experimentally determined value or 14 on a scale from 0 to 255. In Step 142, pixels of the image is traversed and all pixels that had a change of luma greater than the threshold are marked as an edge. The output is stored in the temporary buffer so that it can be analyzed to determine if it is a suitable output image. At step 144, the temporary buffer is divided into 32 pixel by 32 pixel tiles and the number of black pixels in each tile is determined. The size of the tiles is arbitrary, however, a size of 32 pixels by 32 pixels is a good tradeoff between quality and speed of operation. All tiles in the temporary buffer are then processed in turn. Accordingly, a first tile is selected. At step 146, if the point count (i.e., the number of black pixels per tile) is less than 100 for the current tile, then Yes path 148 is taken to step 150. This is the case where there is too little detail in the sketch image. At step 150 the threshold is decreased so that more black pixels will be generated for this tile. At step 152, the threshold is set for all pixels in the current tile to 14−(116−point count)/30. If at step 146, the point count is more than or equal to 100 for the current tile, then No path 154 is taken to step 156. This is the case where there is too much detail for the sketch image. At step 156 the threshold is increased so that fewer black pixels will be generated for this tile. At step 158, the threshold is set for all pixels in the current tile to 14+(point count+51)/100. In either case, processing continues with step 160. At step 160, if there are more tiles in the temporary buffer to process, then Yes path 162 is taken to step 146 and processing of the next tile. Otherwise, No path 164 is taken and processing of the adaptive threshold calculation ends at end step 166.

Note that the values used for the adaptive threshold settings disclosed above are sample values for one embodiment of the present invention. It will be apparent to those skilled in the art that these values may be modified, thereby tuning the adaptive threshold algorithm for different situations and operating environments.

Analysis of the steps of FIGS. 6 and 7 shows that each sketch image is generated twice when a standalone sketch image is being processed, once as a temporary buffer in step 142 of FIG. 7 and again in step 110 of FIG. 6. However, if a video stream is being processed, a good approximation of the current sketch image can be determined from the previous sketch image in the stream output by step 110 of FIG. 6. Hence, step 142 of FIG. 7 only obtains the output of step 110 of FIG. 6 for the previous frame. For a video stream, steps 144 through 164 of FIG. 7 are performed on the output of step 110 of FIG. 6 for the previous sketch image, not a temporary sketch image. This eliminates extra computations when processing video streams. Additionally, the thresholds do not need to be reset on every frame when processing video streams. In one embodiment, step 108 of FIG. 6 is performed approximately once per second, or every 10 to 20 frames.

Figure 8:
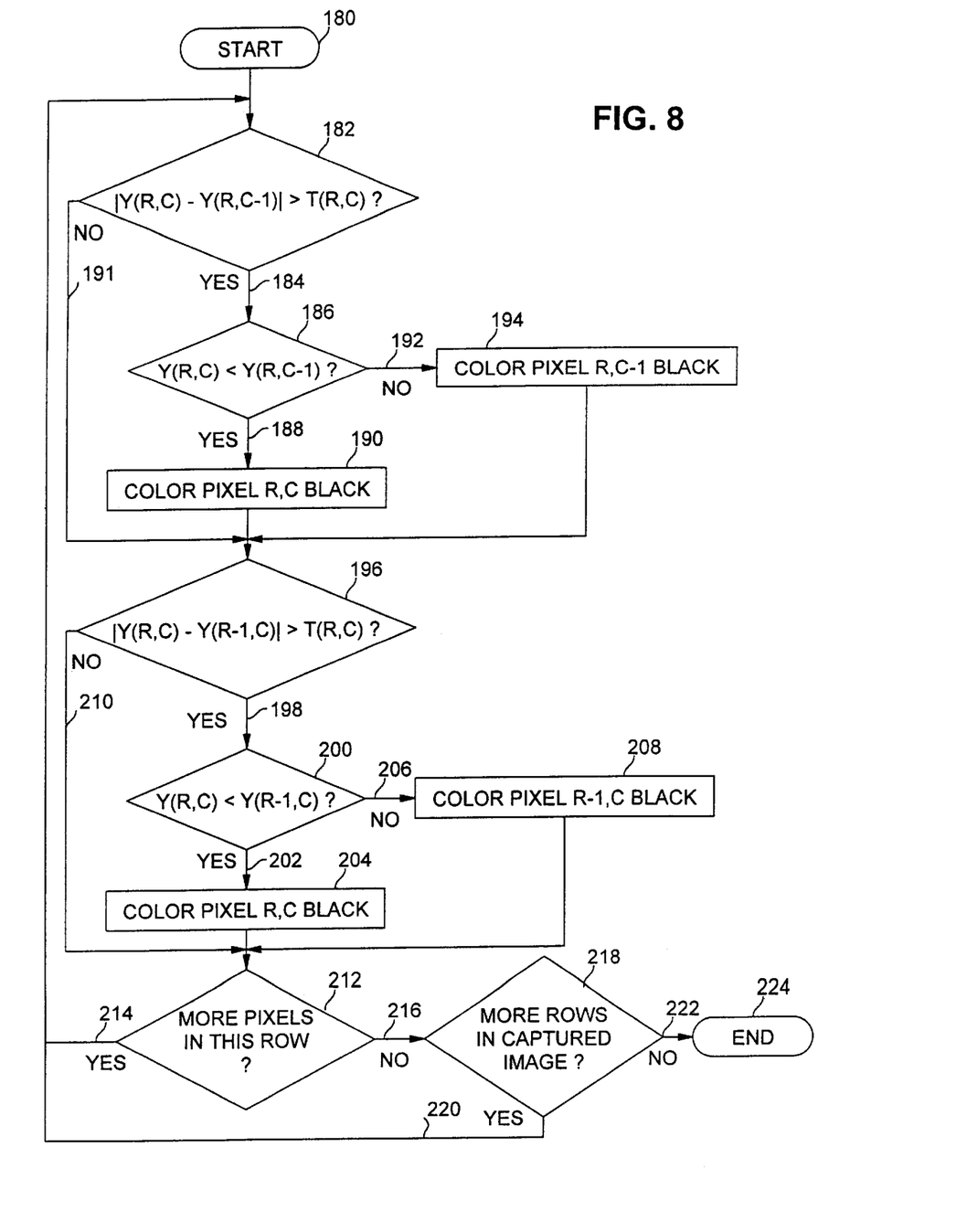
FIG. 8 is a flow diagram of the steps for marking of edge pixels.

FIG. 8 is a flow diagram of the steps for marking of edge pixels of step 110 of FIG. 6. All pixels in the captured image are processed by examining each row in turn starting at row 2, and all pixels in each row in turn starting at column 2. Row 1 and columns 1 and the last column are skipped. In the steps below, the current pixel is denoted by coordinate (R, C) and has a luma value denoted by Y(R, C). The pixel to the left of the current pixel is at coordinate (R, C-1) and has a luma value denoted Y(R, C-1). Processing starts with the current pixel set to (R=2, C=2). After start step 180, if the absolute value of the luma value of the current pixel minus the luma value of the pixel immediately to the left of the current pixel is greater than the threshold value of the current pixel at step 182, then Yes path 184 is taken to step 186. The pixel in the output sketch image that corresponds to the darker of the two neighboring pixels of the captured image is set to black. Hence, at step 186 if the luma value of the current pixel (Y(R, C)) is less than the luma value of the pixel immediately to the left of the current pixel (Y(R, C-1)), then Yes path 188 is taken to step 190. At this step, the current pixel is set to black in the output sketch image. Otherwise, No path 192 is taken to step 194. At step 194, the pixel immediately to the left of the current pixel is set to black in the output sketch image. If at step 182 the absolute value of the luma value of the current pixel minus the luma value of the pixel immediately to the left of the current pixel is not greater than the threshold value of the current pixel, then No path 191 is taken and processing continues with step 196.

The pixel below the current pixel, at coordinate (R-1, C) and having a luma value denoted Y(R-1, C) is considered next. At step 196, if the absolute value of the luma value of the current pixel minus the luma value of the pixel below the current pixel is greater than the threshold value of the current pixel, then Yes path 198 is taken to step 200. The pixel in the output sketch image that corresponds to the darker of the two neighboring pixels of the captured image is set to black. Hence, at step 200, if the luma value of the current pixel is less than the luma value of the pixel immediately below the current pixel, then Yes path 202 is taken to step 204. At this step, the current pixel in the output sketch image is set to black. Otherwise, No path 206 is taken to step 208. At this step, the pixel immediately below the current pixel in the output sketch image is set to black. Processing continues in either case at step 212. If at step 196 the absolute value of the luma value of the current pixel minus the luma value of the pixel below the current pixel is not greater than the threshold value of the current pixel, then No path 210 is taken to step 212.

If more pixels in this row are to be processed at step 212, the column index is incremented to refer to the next pixel in the current row. In this case, Yes path 214 is taken to step 182 for processing of the next pixel in the current row. Otherwise No path 216 is taken to step 218, meaning that all pixels in the current row have been processed. If more rows in the captured image are to be processed at step 218, the row index is incremented, the column index is set to two and Yes path 220 is taken to step 182 for processing of the next row. Otherwise, No path 222 is taken to end step 224 and edge marking processing is complete.

Figure 9:
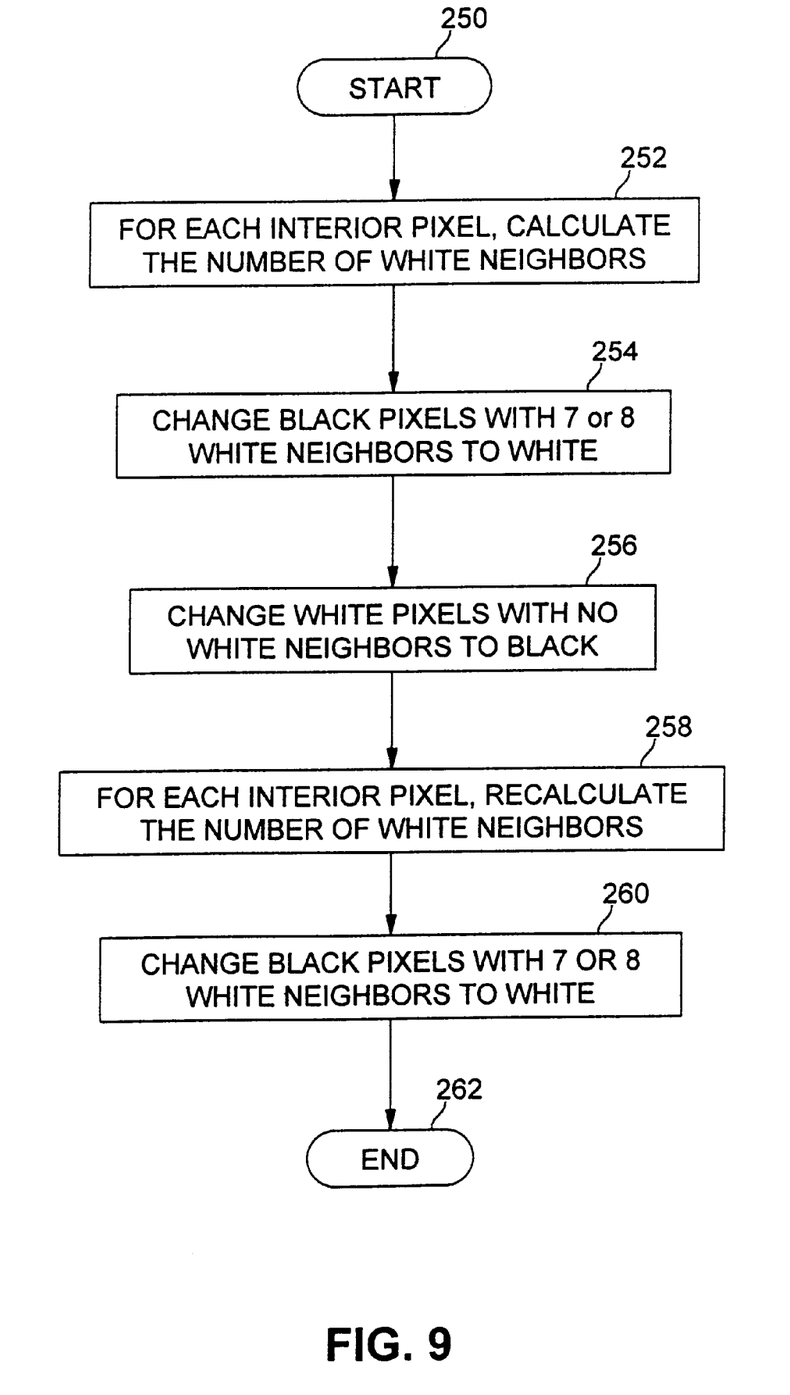
FIG. 9 is a flow diagram of the steps for noise reduction.

FIG. 9 is a flow diagram of the steps for noise reduction of step 112 of FIG. 6. In one embodiment of the present invention, the following steps are used to reduce the noise in the output sketch image. After start step 250, for each interior pixel of the output sketch image, the number of white neighbors is calculated at step 252. At step 254, the black pixels with seven or eight white neighboring pixels are set to white. Neighboring pixels are those pixels immediately adjacent the current pixel in all directions. At step 256, the white pixels with no white neighboring pixels are set to black. Next, at step 258, for each interior pixel, the number of white neighbors is recalculated. At step 260, the black pixels with seven or eight white neighbors are changed to white, and all white pixels are left alone. Noise reduction processing ends at end step 262.

Figure 10:
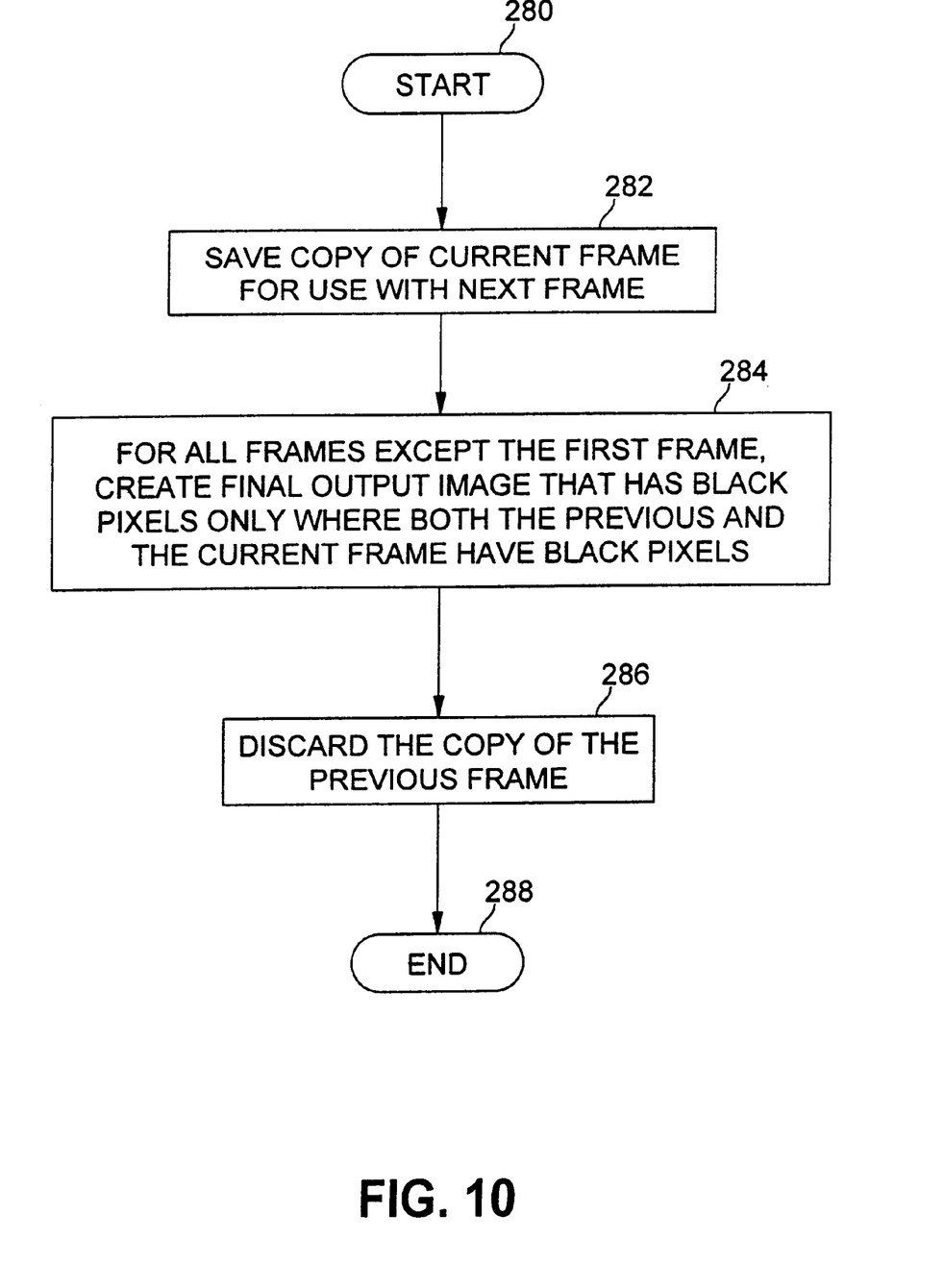
FIG. 10 is a flow diagram of the steps for temporal smoothing.

FIG. 10 is a flow diagram of the steps for temporal smoothing of step 114 of FIG. 6. After start step 280, a copy of the current frame of the output sketch image is saved at step 282 for use in processing the next frame. At step 284, for all frames except the first frame, a final output sketch image is created that has black pixels only where both the previous and the current frame have black pixels. At step 286, the copy of the previous frame in the video sequence is discarded. Temporal smoothing ends at end step 288.

The OR operation of step 284 is important for reducing the effects of noisy cameras when processing video streams. Noise in the camera can show up in two ways, spatial and temporal. Spatial noise means that straight lines appear jagged. Temporal noise is how the color of an individual pixel changes over time, even if there are no changes in the scene. Consider focusing a camera on a wall having a single color and tracking the color of a particular pixel over time. If the camera produced no noise, the pixel would have only one value, the true color of the wall. However, due to noise in the camera, on some frames of a video sequence, the pixel will have a different color. Hence, for any frame there is a probability function that determines what color the pixel will be. Pure noise would be a level function where any color is as likely as any other. A perfect camera would have a spike at probability 1.0 at the particular color of the wall. Experimentally, almost every color has a small, but non-zero probability of occurring. This causes problems with threshold processing. A solution is to perform an OR operation so that an edge is recognized as an edge until it has been seen in more than one frame.

Note that for a video stream, the thresholds can be calculated periodically (in one embodiment, once every second works well), instead of for every frame. This reduces processor overhead, which is important when the video input from the camera is being processed in real-time. Another way to reduce the processor overhead is to increase the tile size used in the adaptive threshold calculation. Once the output sketch image is generated, it can be displayed to the user. The user can then print it on the PC's printer, or draw on it or color it while displayed on the screen using associated application program tools.

An alpha mix of the input captured image and the output sketch image also produces entertaining results. An alpha mix is an additive weighted sum of the colors of two images. The output color is equal to alpha * (image 1 color)+(1-alpha * (image 2 color)). If a pixel is in a format where there are multiple components to the color (such as RGB), this operation is performed on all of the components, typically, but not necessarily with the same value for alpha. In one embodiment, a mix with an alpha of 50% produces a cartooned image. Since the sketch image only contains black and white colors, this mix washes the colors of the original captured image and introduces sketch lines, producing a cartoon-like image. An embodiment of a cartoon image generation method is shown below in Table I. Additionally, a low pass filter can be run on the chroma information in order to further smooth color of the image. Other coloring methods known to those skilled in the art may also be used to color the sketch image to produce the cartoon image.

TABLE 1 for all pixels in the images loop
   if the pixel is white in the sketch image (i.e., not an edge)
      set cartoon image pixel to alpha * (original input color)
         +(1-alpha)*(white color)
   if the pixel is white in the sketch image (i.e., an edge pixel)
      set cartoon image pixel to black
end loop Because the steps of the present invention operate on individual image bitmaps, a sketch movie and a cartoon movie can be produced from an original digital video file (such as an AVI file) by applying the above methods on each bitmap (frame) of the file. The above embodiments also allow the user to capture a video sequence by the camera and then automatically convert it to a sketch movie or cartoon movie.

Figure 11:
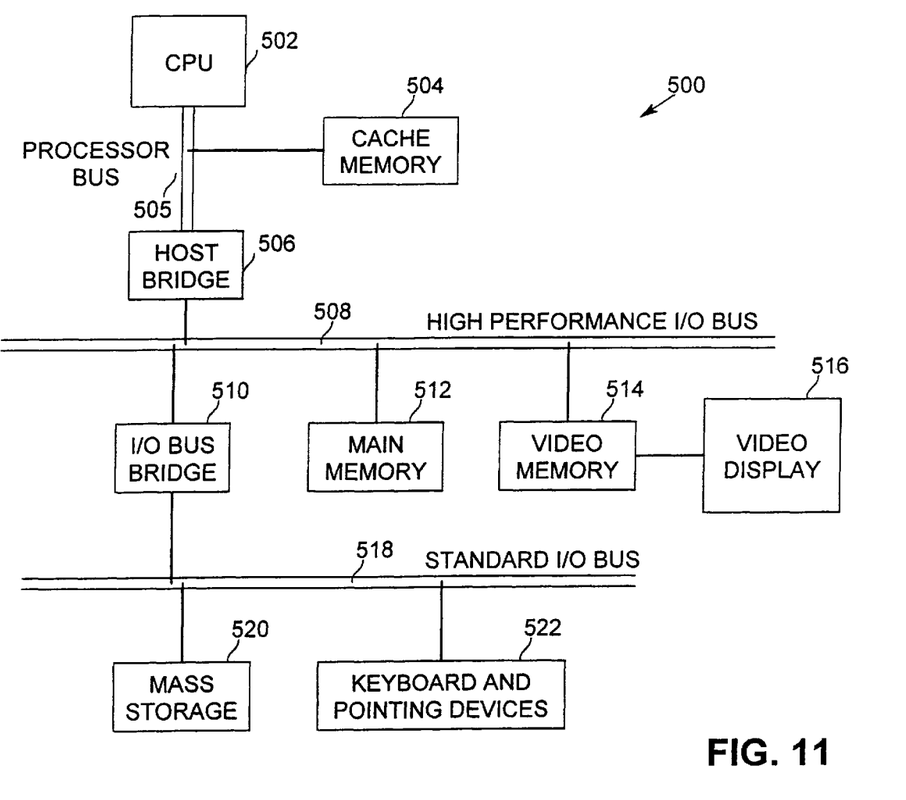
FIG. 11 illustrates a sample computer system suitable to be programmed with the sketch generation method in accordance with embodiments of the present invention.

FIG. 11 illustrates a sample computer system suitable to be programmed with the sketch generation method in accordance with embodiments of the present invention. Sample computer system 500 may be used to execute the processing steps described above for the methods disclosed in FIGS. 6 through 10. Sample computer system 500 is representative of computer systems based on the PENTIUM®, PENTIUM® Pro, and PENTIUM® II microprocessors available from Intel Corporation, although other computer systems (including personal computers (PCs) having other microprocessors, engineering workstations and the like) may also be used. Sample computer system 500 includes Central Processing Unit (CPU) 502 and cache memory 504 coupled to each other through processor bus 505. Sample computer system 500 also includes high performance I/O bus 508 and standard I/O bus 518. Processor bus 505 and high performance I/O bus 508 are bridged by host bridge 506, whereas high performance I/O bus 508 and standard I/O bus 518 are bridged by I/O bus bridge 510. Coupled to high performance I/O bus 508 are main memory 512 and video memory 514. Coupled to video memory 514 is video display 516. Coupled to standard I/O bus 518 are mass storage 520, and keyboard and pointing devices 522.

These elements perform their conventional functions well known in the art. In particular, mass storage 520 is used to provide permanent storage for the executable instructions of the sketch generation method and the digital video file, whereas main memory 512 is used to temporarily store the executable instructions of the sketch generation method during execution by CPU 502.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of generating a sketch image comprising:
    performing an adaptive luma chroma difference calculation to find and mark edges of objects in an input image as lines forming objects in the sketch image.

2. The method of claim 1, further comprising accepting the input image from a digital camera.

3. The method of claim 1, further comprising accepting the input image from a storage medium.

4. The method of claim 1, further comprising repeating the performing step for a plurality of input images in sequence to form a stream of sketch images.

5. The method of claim 4, further comprising displaying the stream of sketch images on a display in real-time.

6. The method of claim 1, further comprising coloring the objects of the sketch image to produce a cartoon image.

7. The method of claim 6, further comprising repeating the performing and coloring steps for a plurality of input images in sequence to form a stream of cartoon images.

8. The method of claim 7, further comprising displaying the stream of cartoon images on a display in real-time.

9. A system for generating a sketch image comprising:
    a device to obtain a first image; and
    a sketch generator coupled to the device to produce a sketch image based on the first image by performing an adaptive luma chroma difference calculation to find and mark edges of objects in the input image as lines forming objects in the sketch image.

10. The system of claim 9, wherein the device is a digital camera.

11. The system of claim 9, further comprising a noise reducer coupled to the sketch generator to reduce noise in the sketch image.

12. The system of claim 11, further comprising a cartoon generator coupled to the noise reducer to generate a cartoon image from the sketch image.

13. A system for generating a sketch image comprising:
    means for obtaining a first image; and
    means for performing an adaptive luma chroma difference calculation to find and mark edges of objects in the first image as lines forming objects in the sketch image.

14. The system of claim 13, further comprising means for reducing noise in the sketch image.

15. The system of claim 13, further comprising means for generating a cartoon image from the sketch image.

16. An apparatus for generating a sketch image comprising:
    a processing unit for executing programming instructions; and
    a storage medium having stored therein a plurality of programming instructions to be executed by the processing unit, wherein when executed, the plurality of programming instructions perform an adaptive luma chroma difference calculation to find and mark edges of objects in a first image as lines forming objects in the sketch image.

17. The apparatus of claim 16, wherein the plurality of programming instructions further comprise instructions to generate a cartoon image from the sketch image.

18. The apparatus of claim 16, wherein the plurality of programming instructions further comprise instructions to reduce noise in the first image.

19. The apparatus of claim 16, wherein the plurality of programming instructions further comprise instructions to reduce noise in the sketch image.

20. A machine readable storage medium having stored therein a plurality of machine readable instructions executable by a processor, the machine readable instructions comprising instructions to perform an adaptive luma chroma difference calculation to find and mark edges of objects in a first image as lines forming objects in a sketch image.

21. The machine readable storage medium of claim 20, wherein the instructions further comprise instructions to generate a cartoon image from the sketch image.

22. The machine readable storage medium of claim 20, wherein the instructions further comprise instructions to reduce noise in the first image.

23. The machine readable storage medium of claim 20, wherein the instructions further comprise instructions to reduce noise in the sketch image.

24. A method for automatically generating a sketch image comprising:
    determining a luma value for each pixel in a first image;
    determining a luma change threshold for each pixel in the first image;
    marking edge pixels in the sketch image based on the luma values and luma change thresholds and coloring the edge pixels a first color and
    applying noise reduction to each pixel of the sketch image by an in-place weighted average of neighboring pixels.

25. The method of claim 24, further comprising creating, before the determining steps, the sketch image with all pixels colored a second color.

26. The method of claim 24, further comprising translating the first image to a first format having luma values when the first image is in a second format that does not have luma values.

27. The method of claim 24, further comprising capturing the first image by a digital camera.

28. The method of claim 24, further comprising accepting the first image from a storage medium.

29. The method of claim 24, further comprising coloring the objects of the sketch image to produce a cartoon image.

30. The method of claim 29, further comprising repeating the determining, marking and coloring steps for a plurality of first images in sequence to form a stream of cartoon images.

31. The method of claim 30, further comprising displaying the stream of cartoon images on a display in real-time.

32. The method of claim 24, further comprising repeating the determining and marking steps for a plurality of first images in sequence to form a stream of sketch images.

33. The method of claim 32, further comprising displaying the stream of sketch images on a display in real-time.

34. The method of claim 32, further comprising applying temporal smoothing to the stream of sketch images.

35. An apparatus for automatically generating a sketch image comprising:
    a processing unit for executing programming instructions; and a storage medium having stored therein a plurality of programming instructions to be executed by the processing unit, wherein when executed, the plurality of programming instructions determine a luma value for each pixel in a first image, determine a luma change threshold for each pixel in the first image, mark edge pixels in the sketch image based on the luma values and luma change thresholds, apply noise reduction to each pixel of the sketch image by an in-place weighted average of neighboring pixels, and color the edge pixels a first color.

36. A machine readable storage medium having stored therein a plurality of machine readable instructions executable by a processor, the machine readable instructions comprising instructions to determine a luma value for each pixel in a first image, determine a luma change threshold for each pixel in the first image, mark edge pixels in the sketch image based on the luma values and luma change thresholds, apply noise reduction to each pixel of the sketch image by an in-place weighted average of neighboring pixels, and color the edge pixels a first color.

* * * * *